(12) United States Patent
Padden

(10) Patent No.: US 9,439,337 B1
(45) Date of Patent: Sep. 13, 2016

(54) TROWEL IMPROVEMENTS AND HANDLE LOCK

(71) Applicant: Stephen Padden, Long Beach, CA (US)

(72) Inventor: Stephen Padden, Long Beach, CA (US)

( * ) Notice: Subject to any disclaimer, the term of this patent is extended or adjusted under 35 U.S.C. 154(b) by 0 days.

(21) Appl. No.: 15/066,483

(22) Filed: Mar. 10, 2016

Related U.S. Application Data

(60) Provisional application No. 62/131,139, filed on Mar. 10, 2015.

(51) Int. Cl.
*A01B 1/00* (2006.01)
*A01B 1/02* (2006.01)

(52) U.S. Cl.
CPC ..................... *A01B 1/022* (2013.01)

(58) Field of Classification Search
CPC ........ A01B 1/022; A01B 1/02; A01B 1/222; A01B 1/00; A01B 1/22; E01H 5/02; E01H 1/1206; E01H 1/12; B25F 1/02; B25F 1/04
USPC ............... 294/53.5, 49, 176, 59, 51
See application file for complete search history.

(56) References Cited

U.S. PATENT DOCUMENTS

| 122,206 | A | * | 12/1871 | Wetmore | ............... | A01B 1/022 2/2.5 |
| 1,344,256 | A | * | 6/1920 | Blackman | ............. | A01B 1/222 172/372 |
| 2,015,517 | A | | 9/1935 | Fransson | | |
| 2,083,918 | A | * | 6/1937 | Napolis | .................... | A01B 1/22 172/375 |
| 2,630,212 | A | | 3/1953 | Mosch | | |
| 4,354,313 | A | | 10/1982 | Naifeh | | |
| 4,424,997 | A | | 1/1984 | Jackson | | |
| 5,063,628 | A | | 11/1991 | Campbell | | |
| 5,097,909 | A | | 3/1992 | Jauhal | | |
| 5,547,240 | A | | 8/1996 | Hartshorn | | |
| 6,131,971 | A | | 10/2000 | Chen | | |
| 6,948,208 | B1 | | 9/2005 | Schlener | | |
| 2012/0098282 | A1 | * | 4/2012 | Langan | .................. | B25F 1/006 294/49 |
| 2012/0256432 | A1 | * | 10/2012 | Best | ........................ | A01B 1/02 294/49 |
| 2014/0283318 | A1 | | 9/2014 | Stoddard | | |
| 2015/0267366 | A1 | * | 9/2015 | O'Hare | ................. | E01H 1/1206 294/1.3 |

FOREIGN PATENT DOCUMENTS

DE 102013106362 A1 * 12/2014 .......... E01H 1/1206

OTHER PUBLICATIONS

"SE 8794SP Stainless Steel Folding Trowel," as offered for sale by Amazon.com at http://www.amazon.com/SE-8794SP-Stainless-Folding-Trowel/dp/B0013KTADE/ref=sr_1_1?e=UTF8&qid=1457640468&sr=8-1&keywords=folding+trowel, downloaded Mar. 10, 2016.

* cited by examiner

*Primary Examiner* — Gabriela Puig
(74) *Attorney, Agent, or Firm* — Quickpatents, LLC; Kevin Prince

(57) ABSTRACT

A collapsible hand trowel comprises a rigid scoop that has a forward end terminating at a point, a rear end, and two opposing side flanges that each has a pivot bar aperture therethrough. A handle includes a rear end, a neck, and a forward end that comprises two laterally-extending pivot bars that traverse the pivot bar apertures of the scoop. An upwardly-projecting V-shaped ridge is formed along a longitudinal axis of the scoop and that terminates into two upturned handle catch flanges, each having an inwardly facing hook adapted to retain the neck of the handle therebetween. A handle lock is adapted to prevent the handle from disengaging the handle catch when the collapsible hand trowel is in the extended configuration, and when the handle lock is in a deployed position.

16 Claims, 5 Drawing Sheets

TROWEL IMPROVEMENTS AND HANDLE LOCK

CROSS-REFERENCE TO RELATED APPLICATIONS

This application claims the benefit of U.S. Provisional Patent Application 62/131,139, filed on Mar. 10, 2015, and incorporated herein by reference.

STATEMENT REGARDING FEDERALLY SPONSORED RESEARCH AND DEVELOPMENT

Not Applicable.

FIELD OF THE INVENTION

This invention relates to gardening and camping tools, and more particularly to a foldable trowel with a handle lock.

DISCUSSION OF RELATED ART

Folding trowels are well known to both gardeners and outdoor sports enthusiasts. If made of molded plastic they tend to be quite bulky because the plastic must be reinforced for strength while the trowel is being used. There is at least one folding trowel that combines molded plastic and aluminum, but this again is quite bulky.

One popular compact folding trowel consists of a stamped stainless steel blade that is curved from side to side in a generally uniform manner along its entire length. The handle of this trowel is made of heavy gauge cylindrical steel bar stock. The ends of the arms project through the sides of the trowel blade and the handle pivots around this point. They travel from a closed position where they lay at a shallow angle sloping upward from the point of the trowel, to a deployed position where the two sides of the handle arms slot into receiving notches in a rear bracket that is formed at the back of the trowel blade. Such a trowel is also somewhat bulky.

All such prior art trowels have the drawback that, when significant pressure is applied to the handle during use, which can happen often when digging through dry soil for example, such force may overcome the friction required to collapse the handle, resulting in the trowel collapsing during use and reducing efficiency of use if not injury to the user.

Therefore, there is a need for a collapsible trowel device that has a low profile for ease of storage and transport, and that provides means for preventing collapse of the trowel during use. Such a needed invention would be durable and relatively easy to manufacture and use. The present invention accomplishes these objectives.

SUMMARY OF THE INVENTION

The present device is a collapsible hand trowel comprising a rigid scoop that has a forward end terminating at a point, a rear end terminating in an upturned handle catch, and two opposing side flanges that each has a pivot bar aperture therethrough. Preferably the rigid scoop includes an upwardly-projecting V-shaped ridge along a longitudinal axis thereof, the height of the V-shaped ridge rising from proximate the point of the forward end to the upturned handle catch.

A handle includes a rear end adapted for manual holding, a neck, and a forward end that comprises two longitudinally-aligned laterally-extending pivot bars, each pivot bar traversing the pivot bar apertures in one of the side flanges of the scoop. The neck is adapted for selective engagement with the handle catch of the scoop.

The handle catch preferably includes a pair of inwardly opposing hooks adapted to retain the neck of the handle therebetween. The neck of the handle is manually compressible so as to allow the neck to clear the inwardly opposing hooks when compressed.

In embodiments including the V-shaped ridge, the faces of the V-shaped ridge extend out at the rear end of the scoop and are angled upward at close to 90-degrees to those faces, to become two handle catch flanges. Each of the two flanges has one of the inwardly facing hooks. The two hooks of both handle catch flanges are adapted to retain the neck of the handle therebetween.

The handle pivots between a collapsed configuration, wherein the handle is cradled within the scoop, and an extended configuration, wherein the neck of the handle is engaged with and retained by the handle catch of the scoop. In the extended configuration, the handle projects rearwardly away from the rear end of the scoop.

The handle includes a handle lock that is selectively moveable between a stowed position and a deployed position. The handle lock is adapted to prevent the handle from disengaging the handle catch when the collapsible hand trowel is in the extended configuration, and when the handle lock is in the deployed position.

The handle lock, in one embodiment, comprises a rigid block disposed within the rear end of the handle and the neck, and is adapted for sliding movement along the metallic bar between the deployed position and the stowed position. In the deployed position, a forward portion of the rigid block fits between the metallic bars of the neck to prevent the compression of the neck. In the stowed position the rigid block is slid back substantially within the rear end of the handle, allowing manual compression of the neck to release the neck from the handle catch.

The forward portion of the handle lock may further include a flashlight and an electric switch for delivery power to the flashlight. The handle lock further includes at least one battery operatively connected to the flashlight via the electric switch. The rear portion of the rigid block may further include a tool compartment for holding tools, such as a ferrocerium fire starter rod, or other tools.

The present invention is a collapsible trowel device that has a low profile for ease of storage and transport, and that provides a handle lock for preventing collapse of the trowel during use. The present invention is durable and relatively easy to manufacture and use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
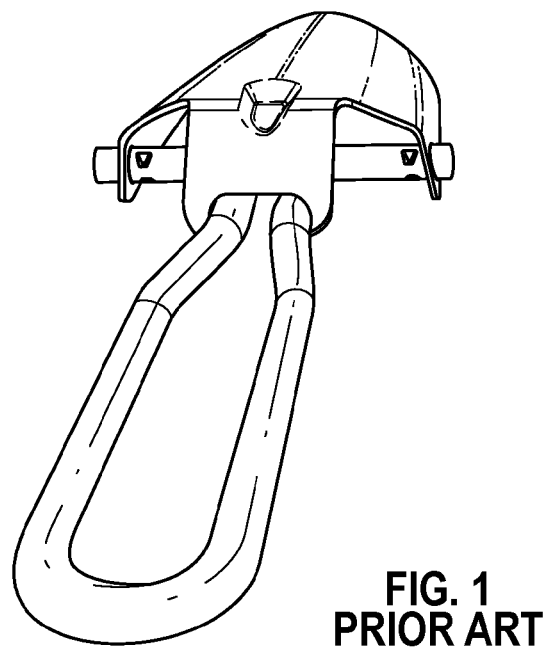
FIG. 1 is a bottom perspective view of a prior art hand trowel.
Figure 2:
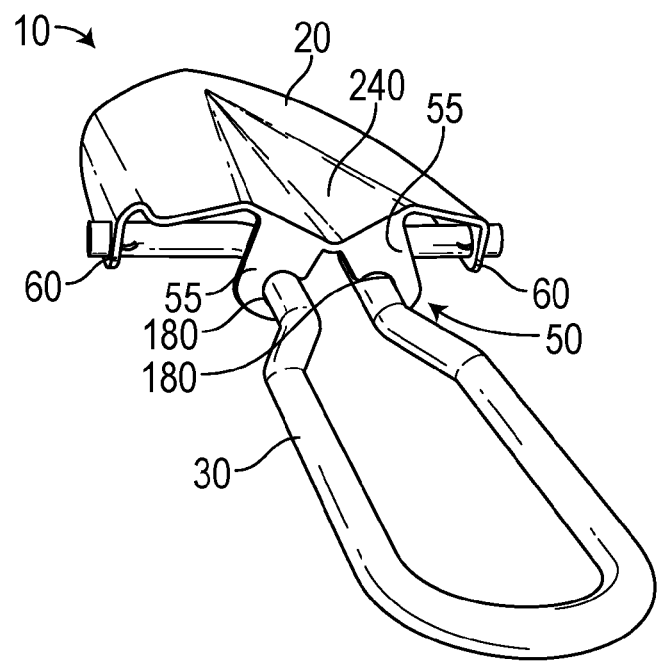
FIG. 2 is a bottom perspective view of an embodiment of the invention having a V-shaped ridge along a longitudinal axis of the scoop thereof.
Figure 3:
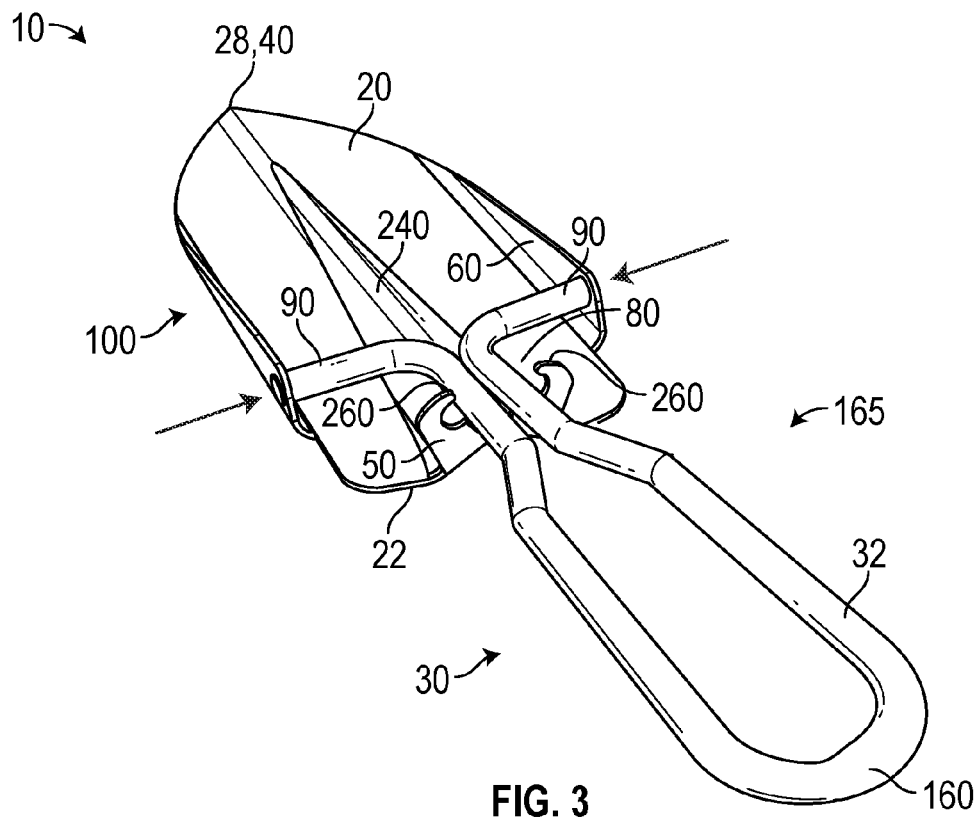
FIG. 3 is a rear perspective view of the invention, illustrated in an extended configuration.
Figure 4:
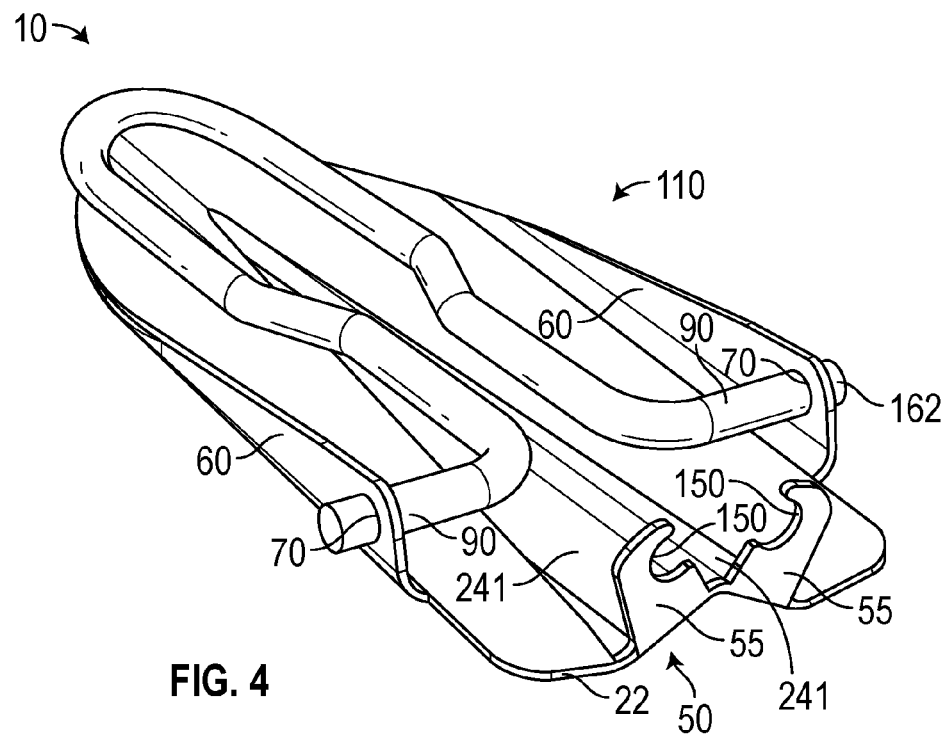
FIG. 4 is a rear perspective view thereof, illustrated in a collapsed configuration.

FIGS. 2-4 illustrate a collapsible hand trowel 10 comprising a rigid scoop 20 that has a forward end 28 terminating at a point 40, a rear end 22 terminating in an upturned handle catch 50, and two opposing side flanges 60 that each have a pivot bar aperture 70 therethrough. Preferably the rigid scoop 20 includes an upwardly-projecting V-shaped ridge 240 along a longitudinal axis thereof, the height of the V-shaped ridge 240 rising from proximate the point 40 of the forward end 28 to the upturned handle catch 50. Such a V-shaped ridge 240 allow for stamping of the scoop 20 from a rigid metallic sheet material while maintaining a low height profile compared to the prior art (FIGS. 1 and 2).

A handle 30 includes a rear end 32 adapted for manual holding, a neck 80, and a forward end 38 that comprises two longitudinally-aligned laterally-extending pivot bars 90, each pivot bar 90 traversing the pivot bar apertures 70 in one of the side flanges 60 of the scoop 20. The neck 80 is adapted for selective engagement with the handle catch 50 of the scoop 20.

The handle catch 50 preferably includes a pair of inwardly opposing hooks 150 adapted to retain the neck 80 of the handle 30 therebetween. The neck 80 of the handle 30 is manually compressible so as to allow the neck 80 to clear the inwardly opposing hooks 150 when compressed (FIG. 3). The handle 30 is preferably made from a semi-rigid material, such as a metallic bar 160, that allows momentary manual compression of the neck 80. The ends 162 of the metallic bar 160 form the laterally-extending pivot bars 90, and a central portion 165 of the metallic bar 160 is formed into the generally U-shaped rear end 32 and the neck 80 of the handle 30.

In embodiments including the V-shaped ridge 240, the V-shaped ridge 240 at the rear end 22 of the scoop 20 terminates into two handle catch flanges 55 (FIG. 4), each having one of the inwardly facing hooks 150. Faces 241 of the V-shaped ridge 240 extend out at the rear end 22 of the scoop 20 and are angled upward at close to 90-degrees to the faces 241, to become two handle catch flanges 55. Each of the two flanges 55 has one of the inwardly facing hooks 150. The two hooks 150 of both handle catch flanges 55 are adapted for retain the neck 80 of the handle 30 therebetween. Preferably each hook 150 further includes an inclined top surface 260 adapted to compress the neck 80 of the handle 30 when the hand trowel 10 is moved into the extended configuration 100 and as the neck 80 engages the hooks 150.

The handle 30 pivots between a collapsed configuration 110 (FIG. 4), wherein the handle 30 is cradled within the scoop 20, and an extended configuration 100 (FIG. 3), wherein the neck 80 of the handle 30 is engaged with and retained by the handle catch 50 of the scoop 20. In the extended configuration 100, the handle 30 projects rearwardly away from the rear end 22 of the scoop 20.

Figure 5:
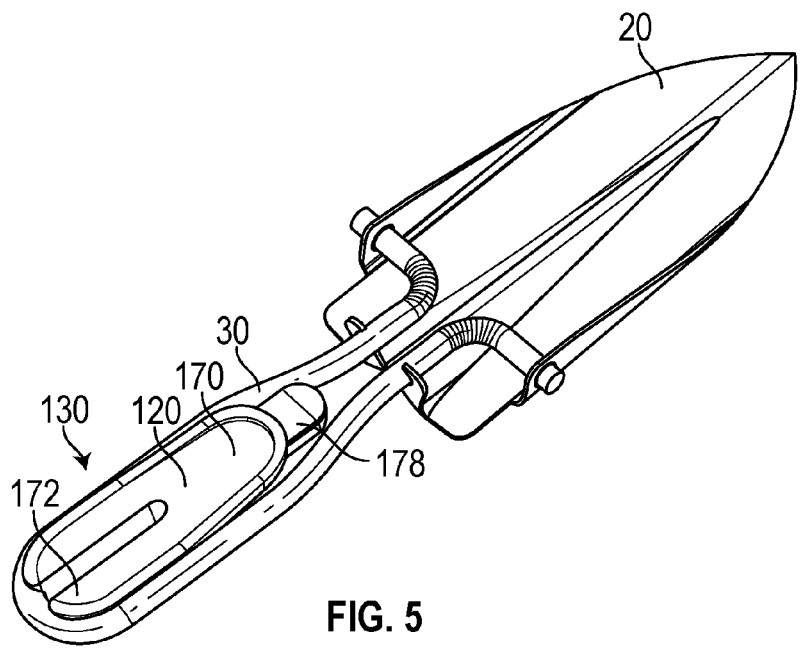
FIG. 5 is a top perspective view of an embodiment having a handle lock illustrated in a stowed position.
Figure 6:
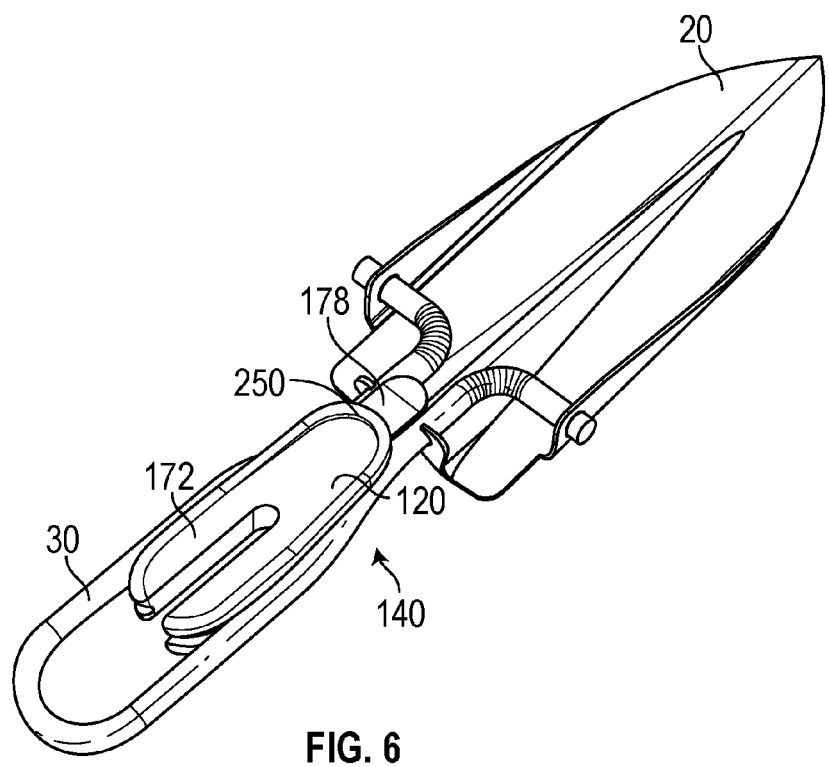
FIG. 6 is a top perspective view thereof, shown with the handle lock in a deployed position.

The handle 30 preferably includes a handle lock 120 that is selectively moveable between a stowed position 130 (FIG. 5) and a deployed position 140 (FIG. 6). The handle lock 120 is adapted to prevent the handle 30 from disengaging the handle catch 50 when the collapsible hand trowel 10 is in the extended configuration 100, and when the handle lock 120 is in the deployed position 140.

The handle lock 120, in one embodiment, comprises a rigid block 170 disposed within the rear end 32 of the handle 30 and the neck 80, and is adapted for sliding movement along the metallic bar 160 between the deployed position 140 and the stowed position 130. In the deployed position 140, a forward portion 178 of the rigid block 170 fits between the metallic bars 160 of the neck 80 to prevent the compression of the neck 80. In the stowed position 130 the rigid block 170 is slid back substantially within the rear end 32 of the handle 30, allowing manual compression of the neck 80 to release the neck 80 from the handle catch 50.

Figure 7A:
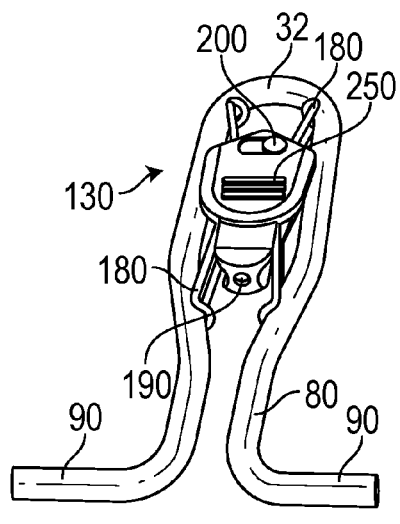
FIG. 7A is a top perspective view of an alternate embodiment of the handle lock in the stowed position, illustrated with a scoop of the invention omitted for clarity of illustration.
Figure 7B:
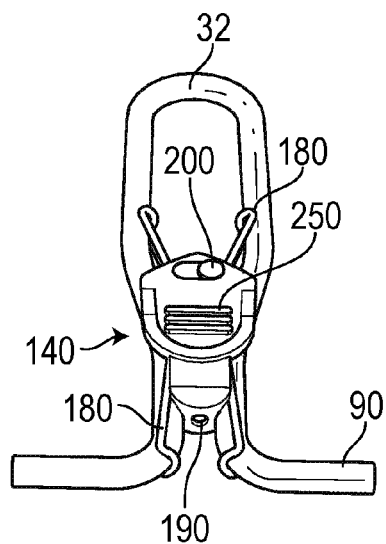
FIG. 7B is a top perspective view of the embodiment of FIG. 7A, but illustrated with the handle lock in the deployed position.
Figure 8:
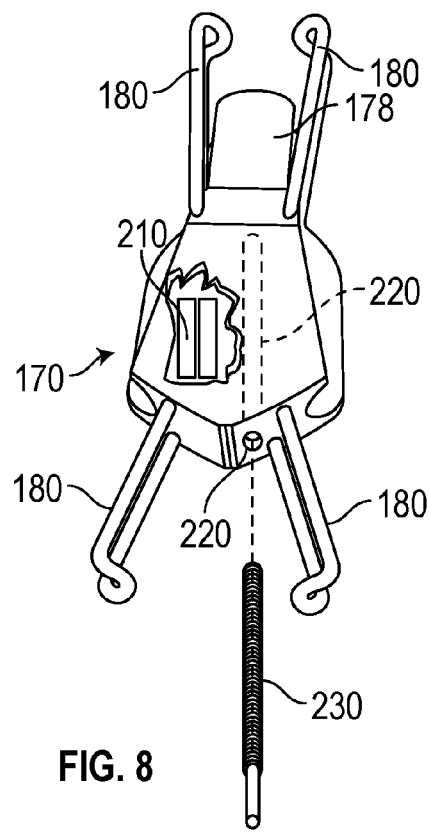
FIG. 8 is a bottom perspective view of the handle lock of FIG. 5, illustrated with the handle and scoop of the invention omitted for clarity of illustration.

In one embodiment, the rigid block 170 further includes at least one pair of laterally extending spring clips 180 (FIGS. 7A, 7B and 8) for retaining the rigid block 170 within two sides of the metallic bar 160 and in either the stowed configuration 130 or the deployed position 140. The finger lock 120 may also include a raised finger grip 250 to facilitate sliding of the handle lock 120 between the stowed position 130 and the deployed position 140.

Figure 9:
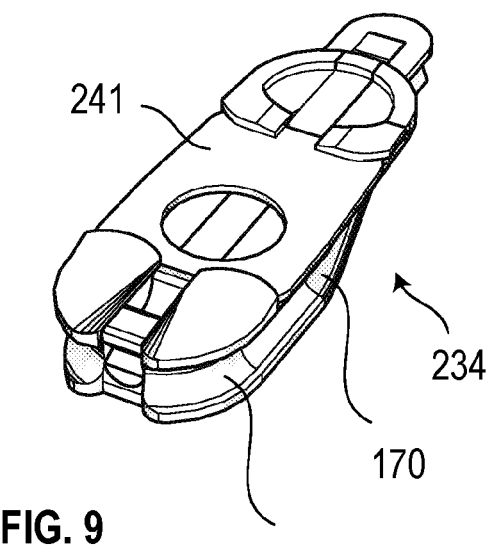
FIG. 9 is a perspective view of an alternate embodiment of a handle lock having a fire starter rod in a collapsed configuration.
Figure 10:
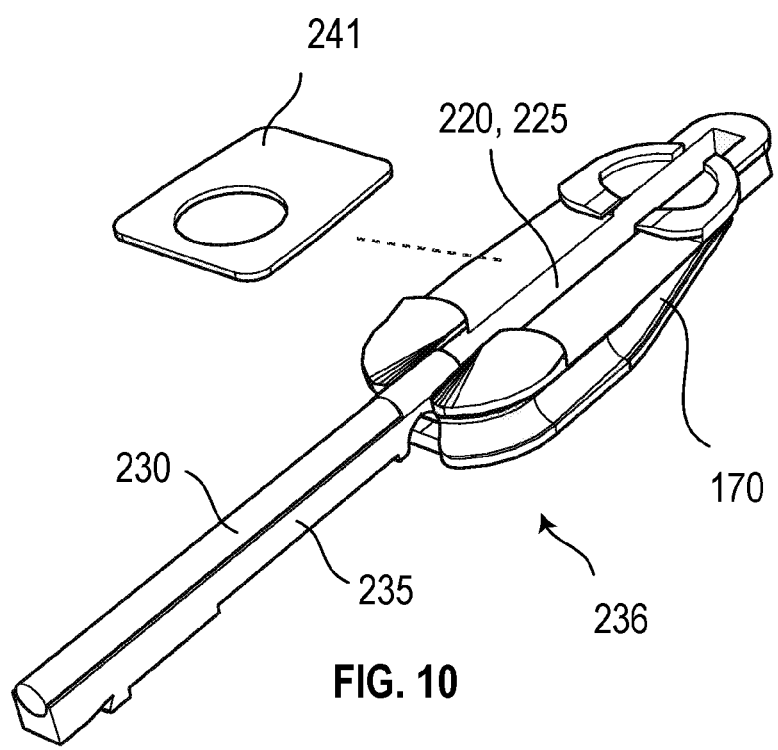
FIG. 10 is a perspective exploded view of the handle lock of FIG. 9, but illustrated in a deployed configuration.

The forward portion 178 of the handle lock 120 may further include a flashlight 190 (FIGS. 7A, 7B and 8), and an electric switch 200 for delivery power to the flashlight 190. The handle lock 120 further includes at least one battery 210 operatively connected to the flashlight 190 via the electric switch 200. A rear portion 172 of the rigid block 170 fits between the metallic bars 160 and the rear end 32 of the handle 30 to maintain the rigid block 170 within the metallic bars 160 of the handle 30. The rigid block 170 may further include a tool compartment 220 for holding tools, such as a ferrocerium fire starter rod 230 and striker plate 241 (FIGS. 9 and 10), or other tools (not shown). In such an embodiment, the compartment is a notch 225 molded into the rigid block 170 that receives the fire starter rod 230 when in a collapsed configuration 234, the fire starter rod 230 adapted to pivot away from the notch up to 180-degrees into a deployed configuration 236. Preferably the metallic striker 241 plate is adapted to hold the fire starter rod 230 in the collapsed configuration 234 unless manually removed from the rigid block 170. The fire starter rod 230 is preferably attached to a rigid, molded substrate 235 to lend strength to the fire starter rod 230.

While a particular form of the invention has been illustrated and described, it will be apparent that various modifications can be made without departing from the spirit and scope of the invention. For example, various shapes and configurations for the handle lock 120 may be devised apart from those illustrated herein. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A collapsible hand trowel comprising:
    a rigid scoop having a forward end terminating at a point,
        a rear end terminating in an upturned handle catch, and
        two opposing side flanges each having a pivot bar aperture therethrough;
    a handle having a rear end adapted for manual holding, a neck, and a forward end comprising two laterally-extending pivot bars longitudinally aligned, each pivot bar traversing the pivot bar aperture in one of the side flanges of the scoop, the neck adapted for selective engagement with the handle catch of the scoop;
    wherein the handle further includes a handle lock that is selectively moveable between a stowed position and a deployed position, the handle lock adapted to prevent the handle from disengaging the handle catch when the collapsible hand trowel is in the extended configuration and when the handle lock is in the deployed position;
    whereby the handle pivots between a collapsed configuration wherein the handle is cradled within the scoop, and an extended configuration wherein the neck of the handle is engaged with and retained by the handle catch of the scoop, the handle projecting rearwardly away from the rear end of the scoop.

2. The collapsible hand trowel of claim 1 wherein the handle catch includes a pair of inwardly opposing hooks adapted to retain the neck of the handle therebetween, and wherein the neck of the handle is manually compressible so as to allow the neck to clear the inwardly opposing hooks when compressed, the handle being made from a semi-rigid material that allows momentary manual compression of the neck.

3. The collapsible hand trowel of claim 2 wherein the neck is made from a metallic bar, each end of which form the laterally-extending pivot bars and a central portion of which forms a generally U-shaped rear end and necks thereof.

4. The collapsible hand trowel of claim 3 wherein the handle lock comprises a rigid block disposed within the handle and neck and adapted for sliding movement along the metallic bar between the deployed position wherein a forward portion of the rigid block fits between the metallic bars of the neck to prevent the compression of the neck, and the stowed position wherein the rigid block is slid back substantially within the handle, thereby allowing manual compression of the neck to release the neck from the handle catch.

5. The collapsible hand trowel of claim 4 wherein the rigid block further includes at least one pair of laterally extending spring clips for retaining the rigid block within two sides of the metallic bar in either the stowed configuration or the deployed configuration.

6. The collapsible hand trowel of claim 4 wherein a rear portion of the rigid block fits between the metallic bars of the rear end of the handle to maintain the rigid block within the metallic bars of the handle when the handle is engaged with the side flanges of the scoop.

7. The collapsible hand trowel of claim 6 wherein the rear portion of the rigid block further includes a tool compartment.

8. The collapsible hand trowel of claim 7 wherein the tool compartment is adapted to hold a ferrocerium fire starter rod.

9. The collapsible hand trowel of claim 8 wherein the compartment is a notch molded into the rigid block that receives the fire starter rod when in a collapsed configuration, the fire starter rod adapted to pivot away from the notch into a deployed configuration.

10. The collapsible hand trowel of claim 9 further including a detachable metallic striker plate adapted to hold the fire starter rod in the collapsed configuration.

11. The collapsible hand trowel of claim 3 wherein the length of each laterally-extending pivot bar is small enough to allow one of the laterally-extending pivot bars to clear the aperture in the side flange of the scoop when the neck of the handle is completely compressed, whereby the handle may be manually detached from the scoop.

12. The collapsible hand trowel of claim 2 wherein each hook includes an inclined top surface adapted to compress the neck of the handle when the hand trowel is moved into the extended configuration.

13. The collapsible hand trowel of claim 1 wherein the forward portion of the handle lock includes a flashlight, the handle lock including an electric switch for switching on the flashlight, the handle lock further including at least one battery operatively connected to the flashlight via the electric switch.

14. The collapsible hand trowel of claim 1 wherein the rigid scoop includes an upwardly-projecting V-shaped ridge along a longitudinal axis thereof, the height of the V-shaped ridge rising from proximate the point of the forward end to the upturned handle catch.

15. The collapsible hand trowel of claim 14 wherein faces of the V-shaped ridge extend out at the rear end of the scoop and are angled upward at close to 90-degrees to the faces, to become two handle catch flanges, each handle catch flange having one of the inwardly facing hooks, the two hooks adapted to retain the neck of the handle therebetween.

16. The collapsible hand trowel of claim 1 wherein a top side of the handle lock includes a raised finger grip to facilitate sliding of the handle lock between the stowed and deployed positions.

* * * * *